(12) United States Patent
Storti

(10) Patent No.: US 12,187,380 B2
(45) Date of Patent: Jan. 7, 2025

(54) TRANSMISSION APPARATUS COMPRISING GEAR REVERSAL FOR MEANS OF TRANSPORT, PREFERABLY PEDAL MEANS OF TRANSPORT

(71) Applicant: SIRAL S.R.L., Recoaro Terme (IT)

(72) Inventor: Fabrizio Storti, Recoaro Terme (IT)

(73) Assignee: SIRAL S.R.L., Recoaro Terme (IT)

( * ) Notice: Subject to any disclaimer, the term of this patent is extended or adjusted under 35 U.S.C. 154(b) by 581 days.

(21) Appl. No.: 17/188,628

(22) Filed: Mar. 1, 2021

(65) Prior Publication Data

US 2021/0269121 A1  Sep. 2, 2021

(30) Foreign Application Priority Data

Mar. 2, 2020 (IT) .................. 102020000004306

(51) Int. Cl.
| | |
|---|---|
| *B62M 11/06* | (2006.01) |
| *B62M 6/55* | (2010.01) |
| *F16H 3/089* | (2006.01) |
| *F16H 61/02* | (2006.01) |
| *F16H 63/18* | (2006.01) |

(Continued)

(52) U.S. Cl.
CPC .............. *B62M 11/06* (2013.01); *B62M 6/55* (2013.01); *F16H 3/089* (2013.01); *F16H 61/0246* (2013.01); *F16H 63/18* (2013.01); *F16H 63/304* (2013.01); *B62M 11/14* (2013.01)

(58) Field of Classification Search
CPC ........ B62M 11/06; B62M 6/55; B62M 11/14; F16H 3/089; F16H 61/0246; F16H 63/18; F16H 63/304; F16H 2200/0047; B62K 7/00

See application file for complete search history.

(56) References Cited

U.S. PATENT DOCUMENTS

| | | | | |
|---|---|---|---|---|
| 5,975,266 A | * | 11/1999 | Balhorn | B62M 11/06 74/354 |
| 9,482,295 B2 | * | 11/2016 | Storti | F16D 41/088 |
| 9,758,211 B2 | * | 9/2017 | Storti | B62M 9/06 |

(Continued)

FOREIGN PATENT DOCUMENTS

| | | | | |
|---|---|---|---|---|
| WO | WO-03078133 A1 | * | 9/2003 | ............ B62M 11/06 |
| WO | WO-2012066124 A1 | * | 5/2012 | .......... B62M 11/145 |

*Primary Examiner* — Victor L MacArthur
(74) *Attorney, Agent, or Firm* — FERENCE & ASSOCIATES LLC

(57) ABSTRACT

A transmission apparatus which reverses transport gears, including a third transmission shaft provided with a plurality of third transmission members each of which is configurable between a non-selected condition and a selected condition. Furthermore, the apparatus comprises a second transmission shaft provided with a plurality of second transmission members axially arranged at a respective third transmission member and engaged with the latter to establish a predetermined transmission ratio. An activation device is operationally associated with said third transmission members to configure at most only one in the selected condition to select the relative transmission ratio. Finally, the apparatus comprises a gear reversal member interposed between a third and a second transmission member both used for gear reversal so that said third transmission shaft rotates inversely with respect to the other transmission ratios.

14 Claims, 11 Drawing Sheets

(51) Int. Cl.
*F16H 63/30* (2006.01)
*B62M 11/14* (2006.01)

(56) References Cited

U.S. PATENT DOCUMENTS

2010/0162841 A1* 7/2010 Cavalerie ............ B62M 11/145
  74/335
2016/0332696 A1* 11/2016 Spaggiari ............... H02K 7/116
2020/0198729 A1* 6/2020 Tsutsui ................... B62M 6/55

* cited by examiner

TRANSMISSION APPARATUS COMPRISING GEAR REVERSAL FOR MEANS OF TRANSPORT, PREFERABLY PEDAL MEANS OF TRANSPORT

The present application claims priority to application No. 102020000004306, which was filed in Italy on Mar. 2, 2020, the contents of which are hereby incorporated by reference.

TECHNICAL FIELD

The present invention relates to a transmission apparatus comprising gear reversal for means of transport, preferably pedal means of transport. In other words, the present invention relates to a transmission ratio selection apparatus capable of implementing a reversal of travel direction and/or a change of speed for means of transport, preferably bicycles and cargo-bikes.

Preferably, the present invention is applied to bicycles and, therefore, reference below will mainly be made to an apparatus for changing the travel direction for bicycles. In any case, it should be borne in mind that such a speed change device could be applied on any means of transport such as, for example, motor vehicles or non-motorised vehicles.

In particular, the present invention relates to an apparatus for changing the travel direction for bicycles adapted to both purely urban use and/or on roads with uniform surface and with minimum unevenness and for extreme/sports use, i.e., for bicycles arranged for use on more uneven surfaces such as cobblestones, mule tracks or trails on dirt or grass.

PRIOR ART

In the state of the art, bicycles are generally provided with a gearbox to make the use of the bicycle more effective, for example if the bicycle must face ascents, unevenness in general or a heavy load must be transported which requires greater effort during the user's pedalling.

Documents WO2012/156613, WO2008/142219 and EP2905213 (of the same Applicant) show several examples of the speed change devices applicable to bicycles.

However, such state-of-the-art devices are limited to illustrating various technical solutions useful for selecting the most useful speed ratio for the situation in which the vehicle is being used. On the other hand, they do not show the possibility of selecting a transmission ratio capable of reversing the travel direction of the vehicle.

In general, bicycles are light, practical vehicles in which the installation of a reverse system is unnecessary because the user could easily reverse their travel direction in various ways.

However, if the vehicle is particularly bulky (for example, in the case of a cargo-bike or bicycle to which a load to be transported is connected) and the road is too narrow to allow the user to reverse gears, alternatively, the weight of the vehicle does not allow the user to manually reverse, the presence of a reverse system would solve the aforementioned problems of the prior art.

Documents GB1462083, US2017/247083 and WO2013/123851 instead show examples of vehicles equipped with transmission apparatuses capable of gear reversal.

However, such prior art documents have some drawbacks which the present invention intends to overcome.

SUMMARY

In this context, the technical task of the present invention is to propose a transmission apparatus comprising gear reversal for means of transport, preferably pedal means of transport, which obviates the drawbacks of the known art as mentioned above.

In particular, an object of the present invention is to provide a transmission apparatus for gear reversal for means of transport capable of allowing a user a simple mechanism for reversing the travel direction of the pedal vehicle used.

In particular, an object of the present invention is to provide an apparatus for gear reversal capable of reversing the rotation of the shaft directly connected to the wheels without changing the rotation direction of the leading drive shaft or the shaft of the pedal cranks.

In other words, the purpose of the apparatus for gear reversal according to the present invention is to allow the reversal of the pedal vehicle on which it is installed without reversing the rotation direction of the cyclist's pedalling.

Furthermore, one of the objects of the apparatus for gear reversal according to the present invention is to provide a transmission system in which reversal is not achieved by the reversal of the rotation direction of the shaft of the pedal cranks by the user.

The stated technical task and the specified objects are substantially achieved by an apparatus for gear reversal for means of transport, which comprises the technical features disclosed in the independent claim. The dependent claims correspond to further advantageous aspects of the invention.

It should be highlighted that this summary introduces, in simplified form, a selection of concepts which will be further elaborated in the detailed description given below.

The present invention relates to a transmission apparatus for gear reversal for means of transport, preferably pedal means of transport.

In particular, the apparatus comprises a shaft of the pedal cranks, a second transmission shaft, a third transmission shaft, an activation device and motorisation means.

The shaft of the pedal cranks is configured to rotate about an axis of the pedal cranks and comprises a main gear wheel configured to transfer the rotary motion of the shaft of the pedal cranks to a second transmission shaft by an inlet pinion engaged with the main gear wheel.

The second transmission shaft is configured to rotate about a second longitudinal axis parallel to and spaced apart from the shaft of the pedal cranks. In particular, the second transmission shaft comprises a plurality of second transmission members integral therewith and arranged in sequence along the second longitudinal axis.

The third transmission shaft is configured to rotate about a third longitudinal axis parallel to and spaced apart from the second longitudinal axis. In particular, the third transmission shaft comprises a plurality of third transmission members arranged in sequence along the third longitudinal axis, each of which is configurable between a non-selected condition, in which it is able to rotate freely about the third longitudinal axis, and a selected condition, in which it is able to rotate about the third longitudinal axis in a manner solidly constrained to the third transmission shaft. Preferably, at least one of said third transmission members and at least one of said second transmission members are engaged with each other to establish a predetermined transmission ratio between the third transmission shaft and the second transmission shaft.

The activation device is adapted to configure in the selected condition at most only one of the third transmission members to select the relative transmission ratio.

Advantageously, the apparatus comprises a free wheel associated with the main gear wheel or with the inlet pinion, which is configured to rotate the main gear wheel or the inlet pinion integrally with the shaft of the pedal cranks when the latter rotates according to a main rotation direction corresponding to the main travel direction of the means of transport and not when the latter rotates according to a reverse rotation direction with respect to the main travel direction.

The motorisation means is associated with at least one second transmission member or a tertiary gear wheel integral with the second transmission shaft. In particular, the motorisation means is configured to perform a movement of the second transmission shaft in accordance with the main travel direction and the reverse travel direction of the means of transport. The reverse travel direction is defined when the activation device has selected one of the second transmission members used for gear reversal engaged with a corresponding third transmission member also used for gear reversal so as to rotate the third transmission shaft in the opposite direction and not the shaft of the pedal cranks due to the presence of the aforementioned free wheel on the main gear wheel or on the inlet pinion.

The invention also relates to a pedal vehicle comprising said transmission apparatus for gear reversal.

BRIEF DESCRIPTION OF THE DRAWINGS

Further characteristics and advantages of the present invention will more fully emerge from the non-limiting description of a preferred but not exclusive embodiment of a transmission apparatus for gear reversal for means of transport, preferably pedal means of transport, as illustrated in the accompanying drawings, in which.

With reference to the drawings, they serve solely to illustrate embodiments of the invention with the aim of better clarifying, in combination with the description, the inventive principles on which the invention is based.

DETAILED DESCRIPTION OF AT LEAST ONE PREFERRED EMBODIMENT

The present invention relates to a transmission apparatus for gear reversal for means of transport, preferably pedal means of transport.

With reference to the figures, a transmission apparatus for gear reversal has been generically indicated with the number 1.

The other numerical references refer to technical features of the invention which, barring indications otherwise or evident structural incompatibilities, the person skilled in the art will know how to apply to all the variant embodiments described.

Any modifications or variants which, in the light of the description, are evident to the person skilled in the art, must be considered to fall within the scope of protection established by the present invention, according to considerations of technical equivalence.

Figure 1:
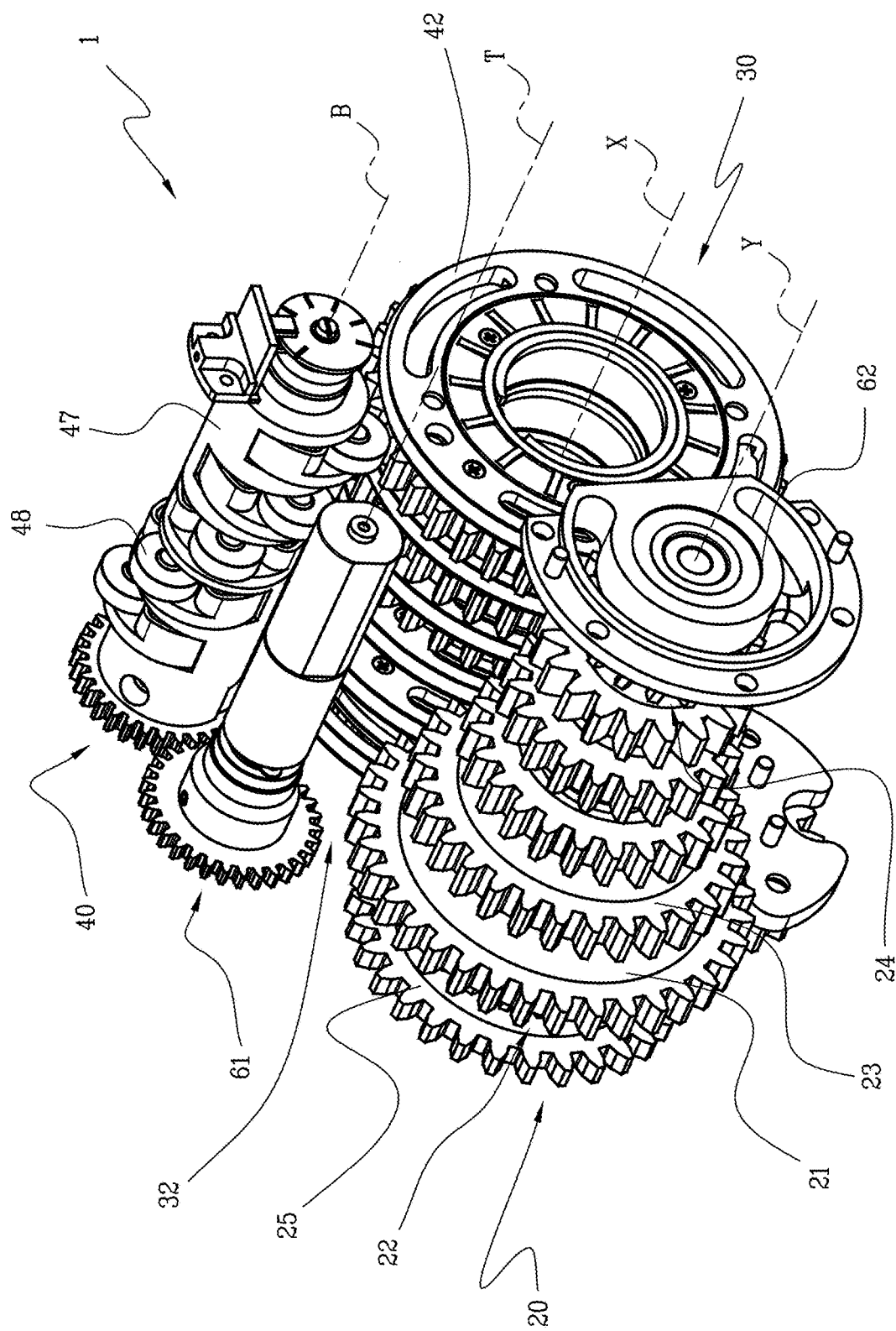
FIG. 1 illustrates, according to a perspective view, a transmission apparatus comprising gear reversal.

FIG. 1 illustrates a transmission apparatus 1 comprising gear reversal for means of transport, preferably pedal means of transport.

Figure 2:
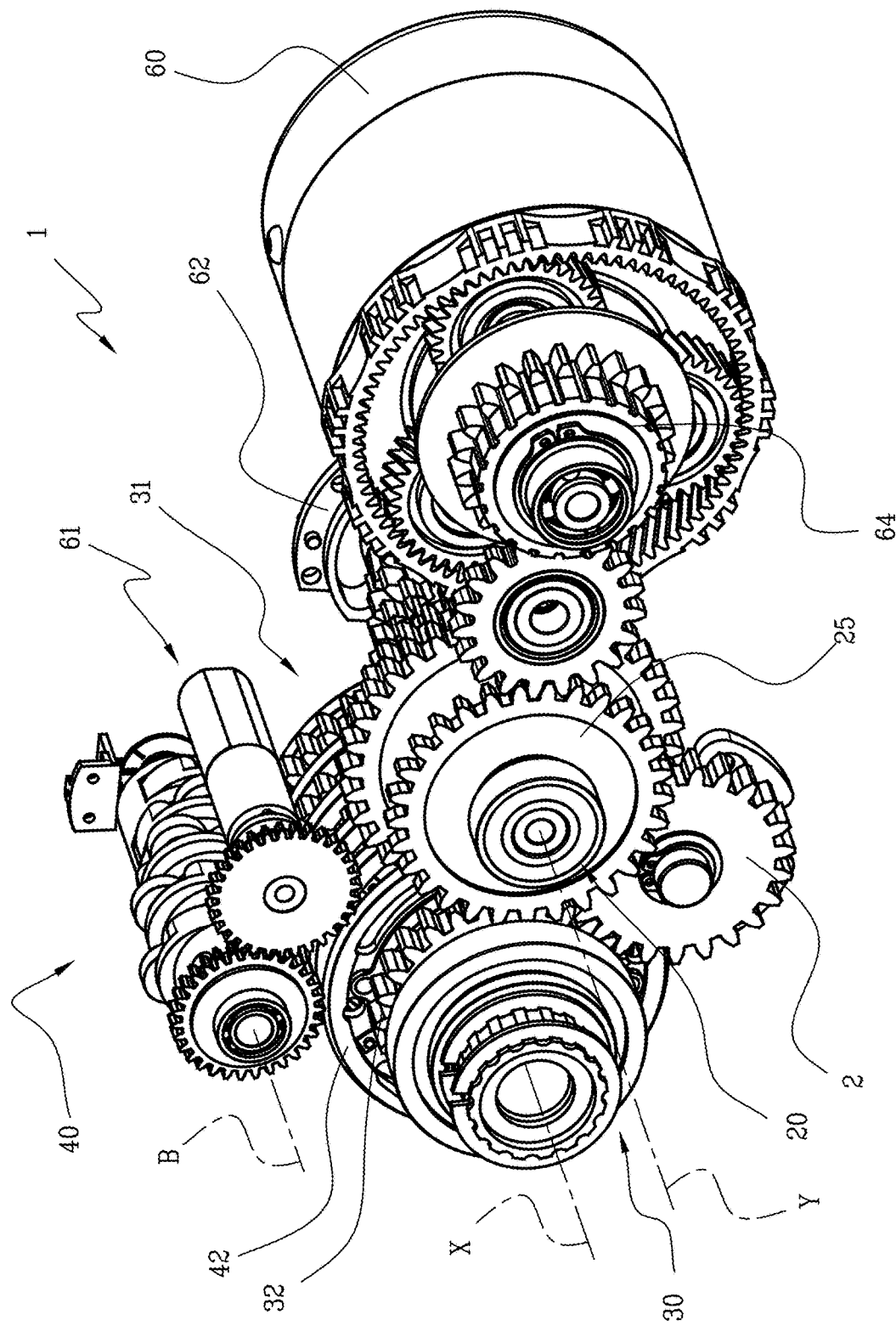
FIG. 2 illustrates, according to a perspective view, a first embodiment of the apparatus for gear reversal illustrated in FIG. 1.

In particular, the apparatus 1 comprises a shaft of the pedal cranks 10 (better seen at least in FIG. 2), a second transmission shaft 20, a third transmission shaft 30, an activation device 40 and a motorisation means 60 (better seen at least in FIG. 2).

The third transmission shaft 30 is configured to rotate about a third longitudinal axis Z and a plurality of third transmission members 31, 32 arranged in sequence along the third longitudinal axis Z. Each third transmission member 31, 32 is advantageously configurable between a non-selected condition, in which it is able to rotate freely about the third longitudinal axis Z, and a selected condition, in which it is able to rotate about the third longitudinal axis Z in a manner solidly constrained with the third transmission shaft 30.

The second transmission shaft 20 is configured to rotate about a second longitudinal axis Y parallel and spaced apart from the third longitudinal axis Z, and a plurality of second transmission members 21, 22 arranged in sequence along the second longitudinal axis Y and axially arranged at a respective third transmission member 31, 32 of the third transmission shaft 30. In detail, the second transmission members 21, 22 are integral in rotation with the second transmission shaft 20 about the second longitudinal axis Y.

Additionally, at least one of the third transmission members 31 and at least one of the second transmission members 21 are engaged with each other to establish a predetermined transmission ratio between the third transmission shaft 30 and the second transmission shaft 20. Preferably, each of the third transmission members 31, 32 is engaged with a respective second transmission member 21, 22.

The shaft of the pedal cranks 10 is configured to rotate about an axis of the pedal cranks X parallel to the third longitudinal axis Z and the second longitudinal axis Y. Furthermore, the shaft of the pedal cranks 10 comprises a main gear wheel 14 (better visible in FIG. 3) configured to transfer the rotary motion of the same shaft of the pedal cranks 10 to the second transmission shaft 20 by an inlet pinion 24 arranged on said second transmission shaft 20 and engaged with the main gear wheel 14.

Advantageously, the main gear wheel 14 and the inlet pinion 24 are splined on the respective shaft so as to directly transfer a torque (for example deriving from pedalling) from the shaft of the pedal cranks 10 to the second transmission shaft 20.

Preferably, the inlet pinion 24 splined on the second transmission shaft 20 has dimensional and mechanical features which can be the same as or different from the second transmission members 21 adjacent thereto. According to an aspect of the invention, the main gear wheel 14 or the inlet pinion 24 comprises a free wheel configured to rotate the amin gear wheel 14 or the inlet pinion 24 in a manner solidly constrained to the shaft of the pedal cranks 10 when the latter rotates about the axis of the pedal cranks X according to a main rotation direction corresponding to the main travel direction opposite the reverse travel direction.

Preferably, the main gear wheel 14 comprises a free wheel configured to rotate the same main gear wheel 14 in a solidly constrained manner to said shaft of the pedal cranks 10 when the latter rotates about the axis of the pedal cranks X according to a main rotation direction corresponding to the main travel direction opposite the reverse travel direction.

Alternatively, the inlet pinion 24 (and not the main gear wheel 14) comprises the free wheel configured to allow the transmission of motion only if the shaft of the pedal cranks 10 is rotated according to a predetermined rotation direction and not according to an opposite counter-rotation direction.

In general, the free wheel is advantageously associated with the pair of gears formed by the main gear wheel 14 and the inlet pinion 24 to allow the shaft of the pedal cranks 10 to transmit motion only when it rotates according to a preferred rotation direction and not according to an opposite direction. Thus, the free wheel is indistinctly directly associated with the main gear wheel 14 or the inlet pinion 24.

In other words, for example referring to the preferred application of the apparatus 1, the free wheel associated with the main gear wheel 14 allows the latter to transfer the torque generated by the cyclist's pedalling only if the pedalling is carried out according to a rotation direction which causes the advancement of the vehicle (regardless of the travel direction). If the cyclist's pedalling occurred in an opposite rotation direction, no force would be transferred to the second transmission shaft 20.

The activation device 40 is operationally associated with the third transmission members 31,32 to configure in the selected condition at most only one of such third transmission members 31,32 to select the relative transmission ratio, for example forwards or in reverse if applied to a pedal vehicle 100.

Advantageously, the motorisation means is associated with at least one second transmission member 21, 22 or with a tertiary gear wheel 25 mounted on the second transmission shaft 20 and integral in rotation therewith. Furthermore, the motorisation means is configured to achieve a movement in a main travel direction and in a reverse travel direction of the means of transport defined when the activation device 40 has selected one of the second transmission members used for gear reversal 22, which is engaged with a corresponding third transmission member also used for gear reversal 32, so as to rotate the third transmission shaft 30 in the opposite direction and not the shaft of the pedal cranks 10 due to the presence of the free wheel associated with the main gear wheel 14 or the inlet pinion 24.

Figure 3:
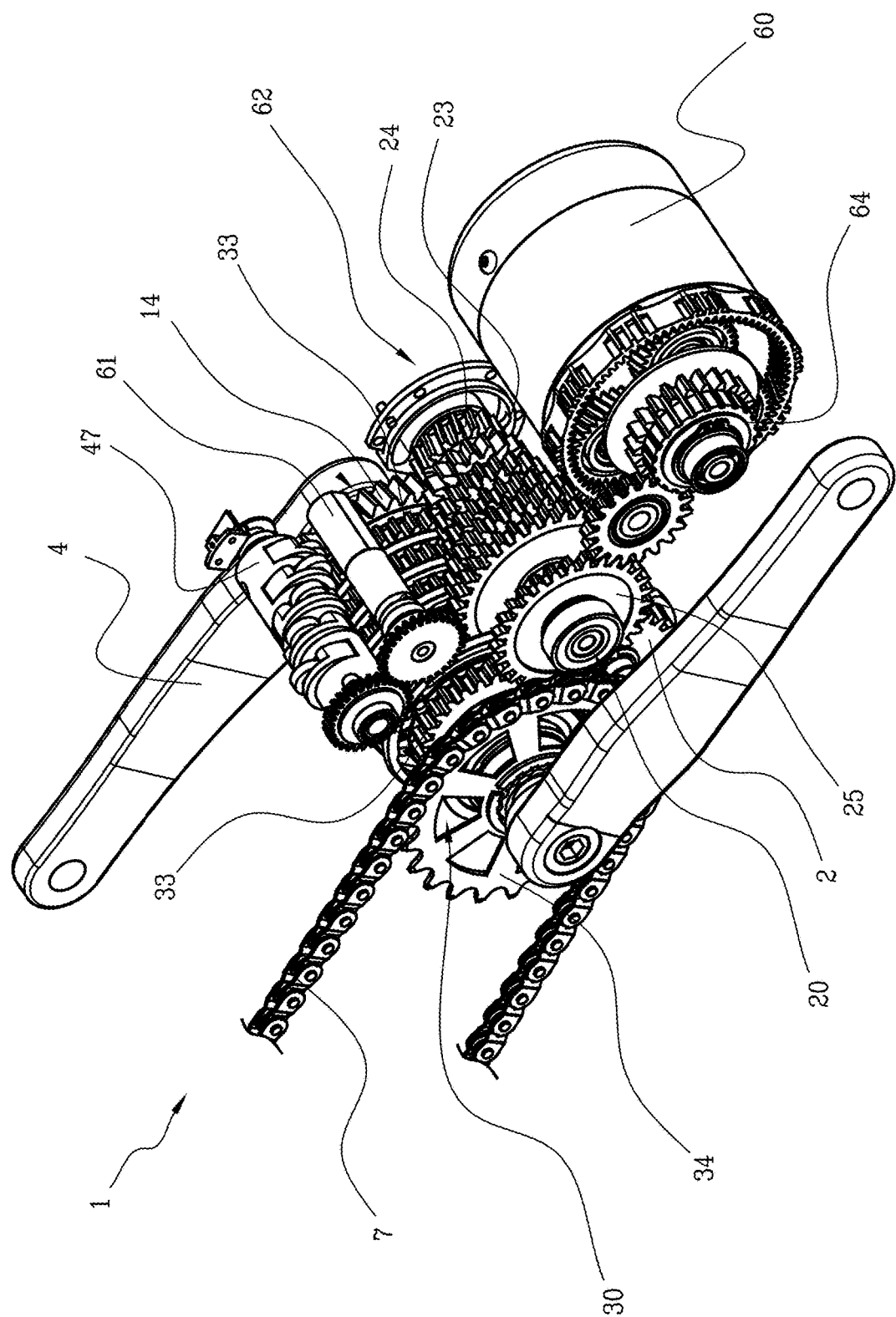
FIG. 3 illustrates, according to a different perspective view, the apparatus for gear reversal of FIG. 2, in which an electric motor and the shaft of the pedal cranks are partially visible.
Figure 4:
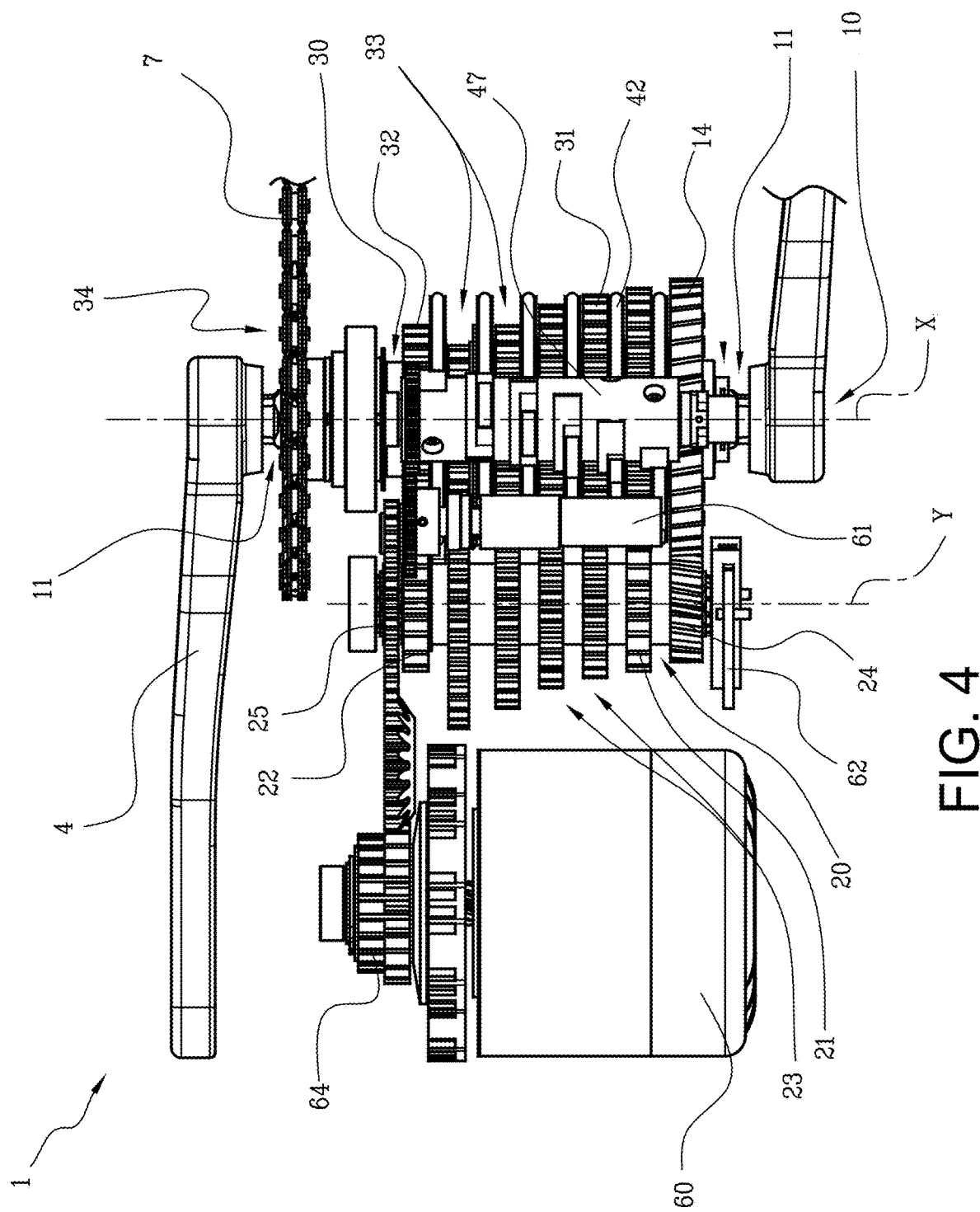
FIG. 4 illustrates, according to a view from above, the apparatus illustrated in FIG. 3.

FIGS. 2, 3, 4 illustrate a first embodiment of the apparatus 1, in which the motorisation means comprises a gear reversal member 2, preferably an idler wheel, interposed and engaged between the second transmission member used for gear reversal 22 and the corresponding third transmission member used for gear reversal 32 so that the third and the second transmission shaft 30,20 have the same rotation direction when the third transmission member used for gear reversal 32 is configured in the selected condition.

In other words, the third transmission members 31, 32 are rotatably arranged along the third transmission shaft 30 independently of each other, so as to be able to rotate with different rotational speeds directly dependent on the respective transmission ratio defined by the coupling between the third and the second transmission member 31, 21, 32, 22. In addition, if they are configured in the non-selected condition, the third transmission members 31, 32 are able to rotate independently of the rotation of the same third transmission shaft 30.

Thereby, although the third and the second transmission members 31, 21, 32, 22 are always engaged with each other (directly or, in the case of gear reversal members, indirectly), and therefore in rotation about the respective third or second transmission shaft 30, 20, the rotation of the third transmission shaft 30 is delegated to only the third transmission member 31, 32 configured in the selected condition and, therefore, made integral with the same third transmission shaft 30.

Advantageously, therefore, the apparatus 1 comprises at least one pair of transmission members 31, 21 such as to define a transmission ratio whereby the third transmission shaft 30 and the second transmission shaft 20 rotate according to two opposite rotation directions and at least one pair of transmission members used for gear reversal 32, 22 such as to define a transmission ratio whereby the third transmission shaft 30 and the second transmission shaft 20, through the interposition of the gear reversal member 2, rotate according to the same rotation direction so as to reverse the advancement direction of the vehicle.

In still other words, with particular reference to the preferred application of the apparatus 1 on a pedal vehicle, the pedalling of a cyclist rotates the second transmission shaft 20 and the relative second transmission members 21, 22 according to a main rotation direction, while the third transmission shaft 30 is rotated as a function of the third transmission member 31, 32 configured in the selected condition. Thus, in the case of configuration in the selected condition of a third transmission member 31 engaged directly to the corresponding second transmission member 21, the third transmission shaft 30 will rotate in a rotation direction opposite the preceding main rotation direction.

Otherwise, in the case of configuration in the selected condition of a third transmission member used for gear reversal 32 engaged to the corresponding second transmission member used for gear reversal 22 by the gear reversal member 2, the third transmission shaft 30 will rotate according to the same main rotation direction as the second transmission shaft 20.

Thereby, the travel direction of the pedal vehicle 100 provided with the apparatus 1 depends exclusively on which third transmission member 31, 32 is selected by the activation device 40, regardless of the rotation direction of the second transmission shaft 20, the latter generally always rotated by the shaft of the pedal cranks 10. In other words, in the example of a pedal vehicle 100 such as a bicycle or a cargo-bike, the cyclist's pedalling and the consequent rotation of the second transmission shaft 20 will always occur in the same rotation direction regardless of the travel direction of the vehicle, while the selection or not of the third transmission member used for gear reversal 32 is able to determine the rotation of the third transmission shaft 30 in the forward or reverse direction of the pedal vehicle 100.

Preferably, the gear reversal member 2 comprises an idler wheel interposed and engaged between the third member used for gear reversal 32 and the second member used for gear reversal 22.

The idler wheel which defines the gear reversal member 2 is engaged interposed between the third member used for gear reversal 32 and the second member used for gear reversal 22.

Such engagement is constantly engaged as it is able to compensate for the reduced radial dimensions of the third and the second member used for gear reversal 32, 22. Thus, during the rotation of the third transmission shaft 30, the third member used for gear reversal 32 rotates opposite the third transmission members 31 as they are all rotatably independent of each other.

Advantageously, when the activation device 40 configures the third member used for gear reversal 32 in the selected condition, the other third transmission members 31 are configured in the non-selected condition.

According to an aspect of the invention, as illustrated in FIGS. 2, 3, 4, the first embodiment of the apparatus 1 can also comprise an electric assist motor 60 which is constantly engaged with the second transmission shaft 20 by a tertiary gear wheel 25 mounted on the same second transmission shaft 20. Consequently, the electric assist motor 60 and/or at least one of the second transmission members 21, 22 comprise at least one free wheel of the motor 64 configured to allow the transmission of the rotational motion from the electric assist motor 60 to the second transmission shaft 20 and, simultaneously, prevent the transmission of the motion from the second transmission shaft 20 to the electric assist motor 60. In other words, the free wheel of the motor 64 is configured to transmit a rotational motion from the electric assist motor 60 to the second transmission shaft 20 in accordance with a single rotation direction of the gears which form the electric assist motor 60.

Since the electric assist motor 60 is always engaged on the second transmission shaft 20, the free wheel of the motor 64 between the gears connecting them is advantageously arranged to prevent the cyclist from having to impart a force such as to rotate both the transmission shafts 30, 20 of the apparatus 1 and the gears of the electric assist motor 60 when the latter is deactivated.

In other words, if the electric assist motor 60 is deactivated or if it provides less power than the cyclist, the rotation of the second transmission shaft 20 is not transmitted to the electric assist motor 60, but entirely to the third transmission shaft 30.

Otherwise, when the electric assist motor 60 is active and provides an auxiliary torque to the cyclist's pedalling, the rotation of the tertiary gear wheel 25 transmits such auxiliary torque to the second transmission shaft 20 whether or not the cyclist is pedalling.

In other words, the electric assist motor 60 is advantageously configured to rotate at least the transmission shafts 30, 20 independently or to assist the pedalling of a cyclist.

Thus, upon configuration in the selected condition of a third transmission member 31, 32, the motor is able to activate the apparatus 1 and, therefore, move the vehicle in both travel directions as a function of the selected transmission ratio.

Figure 5:
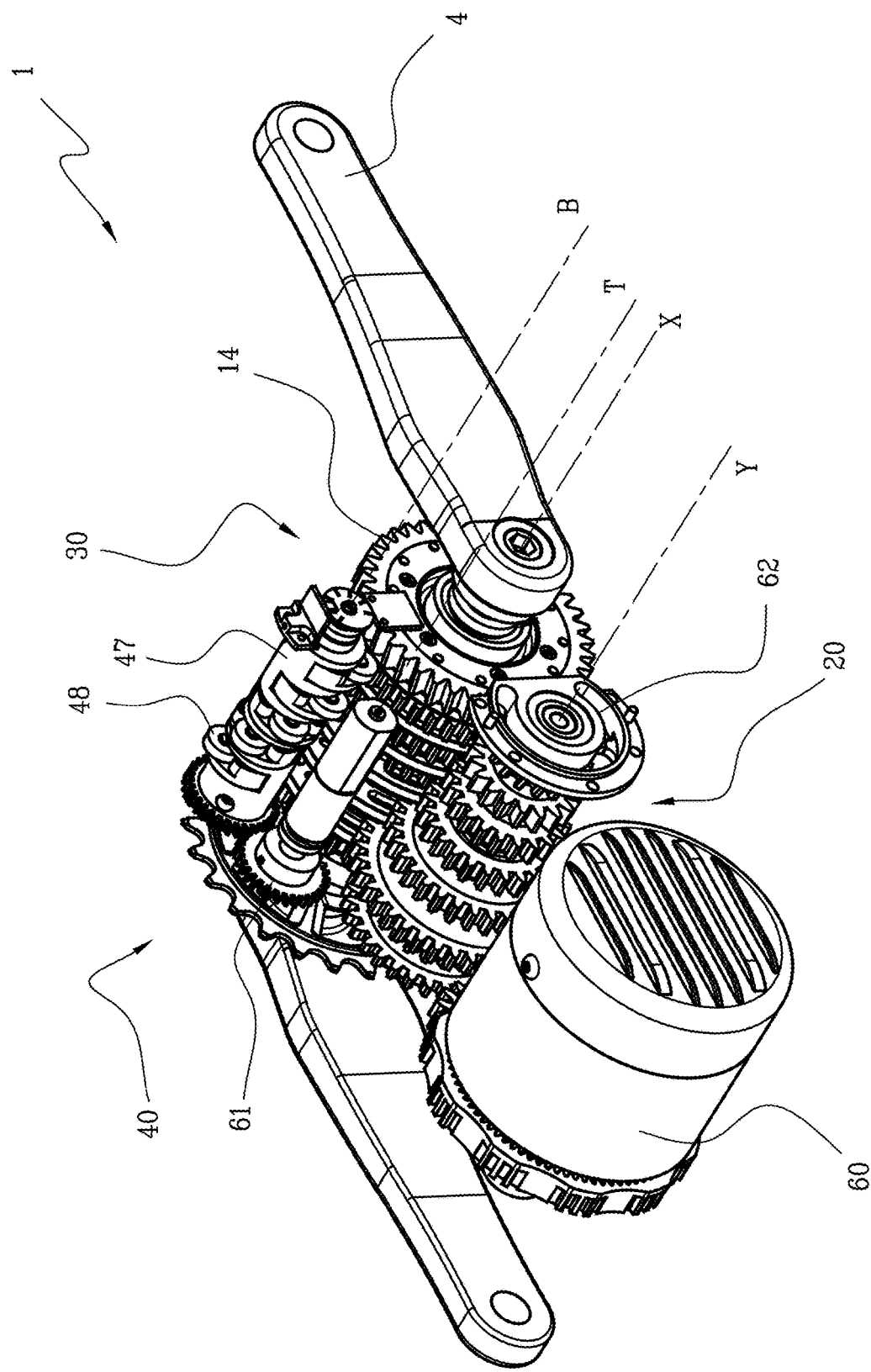
FIG. 5 illustrates, according to a perspective view, a second embodiment of the apparatus for gear reversal illustrated in FIG. 1.
Figure 6:
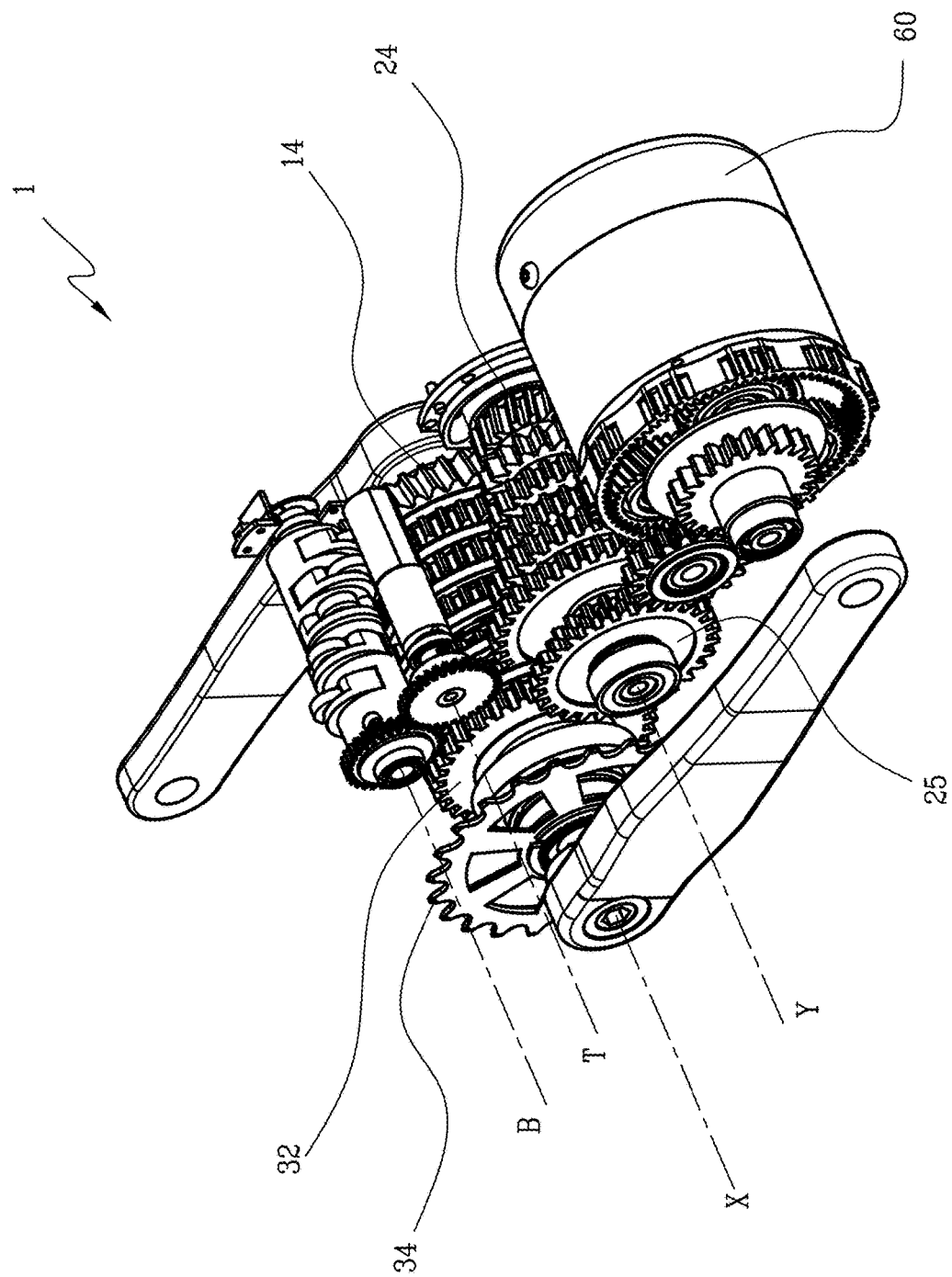
FIG. 6 illustrates, according to a different perspective view, the apparatus for gear reversal illustrated in FIG. 5.

FIGS. 5 and 6 illustrate a second embodiment of the apparatus 1, in which the motorisation means comprises an electric assist motor 60 engaged with a tertiary gear wheel 25 mounted on the second transmission shaft 20 and a control unit connected to the aforesaid electric assist motor 60. More specifically, the motorisation means lacks a gear reversal member, for example an idler wheel, interposed between the third member used for gear reversal 32 and the second member used for gear reversal 22.

The control unit is advantageously programmed to configure the electric assist motor 60 between a forward condition, in which it transmits to the shaft of the pedal cranks 10 and the third transmission shaft 30 a rotation in accordance with the main rotation direction, and a reverse condition, in which it transmits to the third transmission shaft 30 a rotation opposite the main rotation direction and, at the same time, does not transmit any rotation to the shaft of the pedal cranks 10.

Preferably, in accordance with such an embodiment, the electric assist motor 60 is kept active by the control unit both during advancement according to the main travel direction of the means of transport, and during advancement according to the reverse travel direction.

In fact, the electric assist motor 60 does not have any free wheel and, at the same time, is engaged directly with at least a second transmission member 21, 22 or with the tertiary gear wheel 25.

Thus when a user pedals, inducing the rotation of the shaft of the pedal cranks 10, the electric assist motor 60 is activated to prevent the staticity thereof from providing a motor-brake to the user's pedalling. Preferably, the greater the torque produced by the user during pedalling, the greater the current supplied to the electric assist motor 60.

When it is desired to set the backward movement of the means of transport (i.e. the reverse movement according to the reverse travel direction), the control unit is programmed to reverse the movement of the electric assist motor 60 which, in turn, will reverse the rotation direction imparted to the second transmission shaft 20, inducing the reverse movement of the means of transport.

Advantageously, the pedal cranks 4 will remain stationary by virtue of the presence of the free wheel on the main gear wheel 14 or on the inlet pinion 24.

In other words, in order to be able to alternate the travel direction of the means of transport between the main travel direction and the inverse travel direction (i.e., reverse), the control unit is configured to reverse the movement of the internal gears of the electric assist motor 60 so that the latter is able to alternate the rotation direction transmitted to the third transmission shaft 30, i.e., the shaft to which the drive wheel 5 (generally the rear wheel) of the means of transport is connected with a fixed snap connection by a transmission chain 7.

Preferably, the electric assist motor 60 (for example in the case of a pedal-assisted bicycle) is powered by an external electrical source to contribute at least partially to the movement of the transmission members 31, 21, in an operating condition of the apparatus 1.

With reference to the preferred application of the apparatus 1 on a pedal vehicle, the electric assist motor 60 is able to operate both as an assistance and autonomously without the cyclist applying any torque on the pedal cranks 4, both during forward and during reverse motion depending on the second transmission member selected by the activation device 40.

Preferably, the electric assist motor 60 is configured to pursue a constant value of driving torque on the second transmission shaft 20, so that a user always exerts the same effort on the pedal cranks 4, regardless of the load (required power) which the drive wheel 5 of a bicycle sends to the cogged crown 34 during a use configuration of the bicycle.

Even more preferably, the electric assist motor 60 is of the "brushless" type so that by means of an electronic management system, the torque delivered and the motor rotation speed can be controlled instantaneously. In order to establish a single and predetermined transmission ratio between the third and the second transmission shaft 30, 20, the transmission carried out by each pair of gear wheels 33, 23 is selectively insertable by the activation device 40 (which, as better described below, comprises an activation disc 42 and a relative drum 47) in order to establish a reversible connection, rotatably integral with the respective transmission shaft 30, 20 and, therefore, to select one of the possible transmission ratios.

According to an aspect of the invention illustrated in the attached figures, the activation device 40 comprises a plurality of activation discs 42, each of which is operatively connected to a respective third transmission member 31, 32. Each activation disc 42 is rotatably movable with respect to the corresponding third transmission member 31, 32 about the third transmission shaft 30 between a first non-operating position and a second operating position. In particular, passing from the first non-operating position to the second operating position, each activation disc 42 is configured so as to selectively rotate integrally with the third transmission shaft 30 the respective third transmission member 31, 32 from the non-selected condition to the selected condition by generating a transitory difference in rotation speed between the same selected third transmission member 31, 32 and the relative activation disc 42.

In still other words, each third transmission member 31, 32 is associated with a respective activation disc 42. Specifically, an activation disc 42 is associated with the third transmission member used for gear reversal 32, while the remaining third transmission members 31 are associated with as many activation discs 42.

Figure 7:
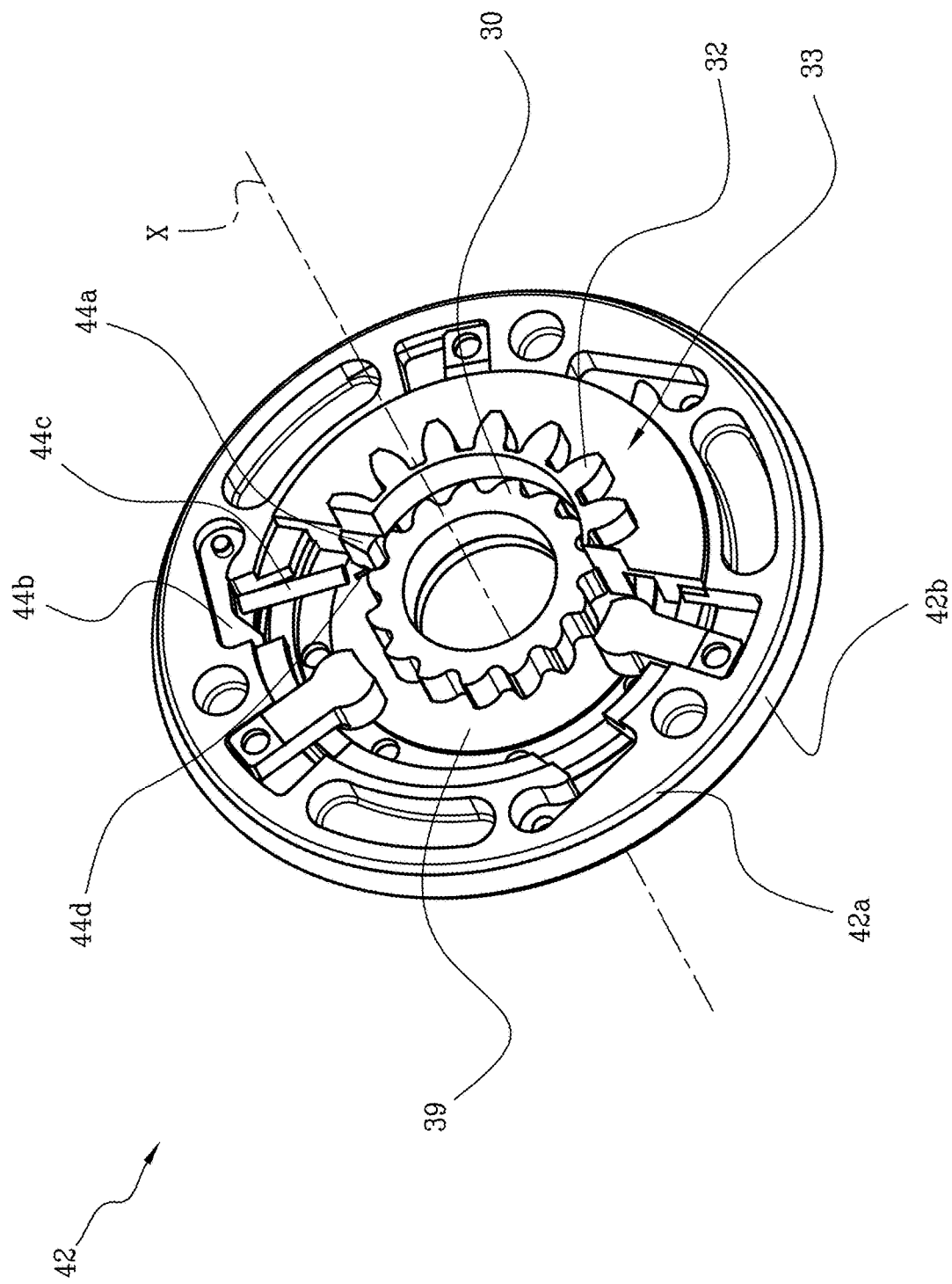
FIG. 7 illustrates, in perspective view, an embodiment example of an activation disc.

FIG. 7 illustrates a possible, but not exclusive, embodiment of an activation disc 42 associated with the third transmission shaft 30.

In FIG. 7 it is also possible to see a support ring 39 of the activation disc 42 and a meshing system 44a-44d operatively interposed between the activation disc 42 and the third transmission shaft 30.

In particular, the support ring 39 is shaped so as to support the rotation of the activation disc 42 about the third longitudinal axis Z. In other words, the support ring 39 is shaped to freely rotate about the third longitudinal axis Z with respect to the third transmission shaft 30, while the activation disc 42 is shaped to rotate independently, as if it were sliding around the support ring 39 which acts as a support and guide.

Preferably, each activation disc 42 has a portion made of a deformable material along a perimeter edge 42a thereof. In a possible aspect of the invention, the deformable material is represented by an annular element 42b made of plastic material and having, for example, a circular section. More precisely, the annular element 42b can be made of a rubber-based material or of a material having mechanical and physical features similar to rubber (silicone, polyurethane, etc.).

Advantageously, the presence of the annular element 42b made of deformable material allows to avoid the use of friction braking members acting on the activation disc 42 and, therefore, to significantly reduce the generation of dust and the consumption of the braking member itself. In the present invention, as better described below, a rotating element 48 deforms the annular element 42b, decelerating the activation disc 42 and, at the same time, such a rotating element 48 continues to rotate about a rotation axis T thereof.

According to a possible aspect of the invention shown in FIG. 7, the meshing system comprises a meshing element 44a, a lever 44b, a piston 44c and an elastic element 44d.

Advantageously, the lever 44b is integral with the activation disc 42, while the meshing element 44a, the piston 44c and the elastic element 44d are integral with the gear wheel 33.

Thereby, the activation disc 42 and the lever 44b are alternately movable to define the first non-operating position and the second operating position of the activation disc 42 in which, respectively, it releases and integrally connects the respective gear wheel 33 to the third transmission shaft 30 through the consequent alternating movement of the piston 44c and the meshing element 44a.

More precisely, when an external force slows the rotation of the activation disc 42 with respect to the third transmission shaft 30 and the selected pair of gear wheels 33, 23, the reversible interlocking system arranges a meshing element 44a thereof in contact with the third transmission shaft 30 to rigidly connect the gear wheel 33 with the third transmission shaft 30. Even more precisely, a deceleration force acting on the annular element 42b of the activation disc 42 induces, by rotating the lever 44b, the movement of the piston 44c which, in turn, moves the meshing element 44a so that its shape correctly meshes in the respective seat obtained on the third transmission shaft 30 (better visible in FIG. 10).

Preferably, the elastic element 44d is a return elastic element configured to restore the non-selected configuration (i.e., the first non-operating position of the activation disc 42) according to which the third transmission shaft 30 and the gear wheel 33 are rotatably disconnected.

Therefore, if the application of a deceleration between the activation disc 42 and the relative gear wheel 33 is such as to overcome the action of the elastic element 44d, the meshing element 44a correctly couples with the seats of the third transmission shaft 30 so as to render the gear wheel 33 rotatably integral.

According to one aspect of the invention (also visible in FIG. 8), the activation device 40 comprises at least one rotating element 48 normally spaced apart from the activation discs 42. In particular, said rotating element 48 is operatively movable towards or away from a respective activation disc 42 configured to deform the portion of deformable material 42b so as to generate the aforementioned transitory speed difference.

In other words, the selection of the transmission ratio occurs with the activation of the interaction between the rotating element 48 and the corresponding activation disc 42 associated with the third transmission member 31, 32. In the case of gear reversal, the rotating element 48 of the activation device 40 acts on the reverse activation disc 42 to make the third transmission member used for gear reversal 32 integral with the third transmission shaft 30.

Thus, the activation disc 42 associated with the reverse transmission is installed on the third transmission shaft 30 in a specular manner to the other activation discs 42 because the rotation thereof is opposite and, consequently, the meshing system must also be driven in a specular manner.

In other words, the activation disc 42 associated with the reverse gear has a meshing system configured opposite that of the other activation discs 42 so as to be able to be activated with a reverse rotation of the third transmission shaft 30 with respect to the other transmission ratios.

Figure 10:
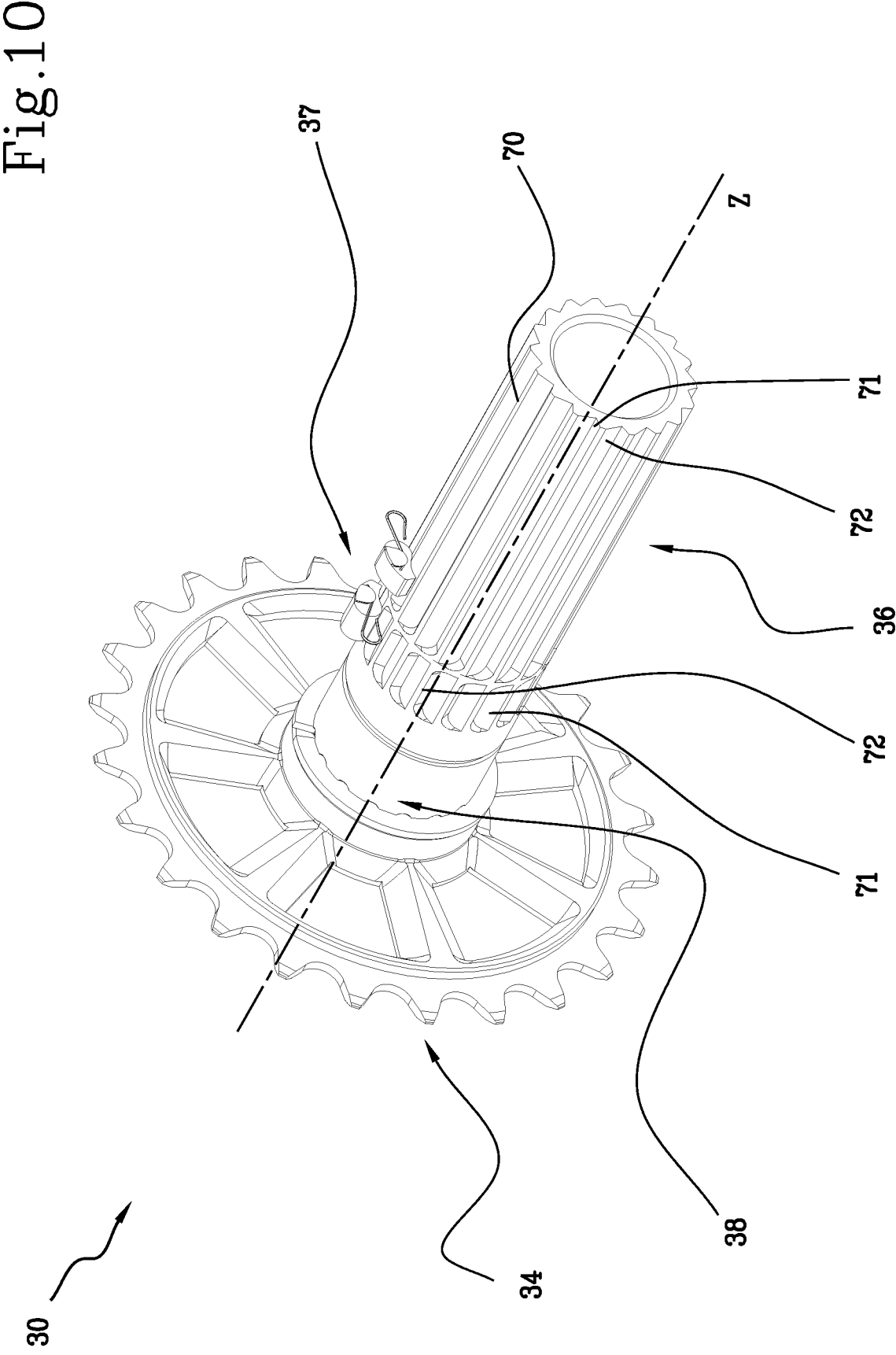
FIG. 10 illustrates, in perspective view, a portion of the third transmission shaft.

To this end, FIG. 10 illustrates a possible embodiment of the third transmission shaft 30.

According to a first aspect of the invention, the third transmission shaft 30 comprises at least a first zone 36 shaped to accommodate each meshing element 44a when the respective activation disc 42 is configured in the second operating position. In particular, the first zone 36 comprises a plurality of recesses 70 obtained radially around the third transmission shaft 30, each of which has an asymmetrical shape with respect to an axis radial to the same third transmission shaft 30 passing through the same recess so as to assist the alternating insertion and extraction movement of the meshing element 44a within the same recess.

Preferably, the shape of each recess of the first zone 36 comprises a slide 71 adapted to assist the alternating insertion/extraction movement of the meshing element 44a from/into the recess 70, and a step 72 adapted to act as an end-stroke during the insertion movement of the meshing element 44a.

Even more preferably, the slide 71 and the step 72 are arranged consecutively along the main rotation direction of the third transmission shaft 30.

According to another aspect of the invention, the third transmission shaft 30 comprises a second zone 37 also shaped to accommodate the meshing element 44a of the third transmission member used for gear reversal 32 when the respective activation disc 42 is configured in the second operating position. In particular, the second zone 37 has a conformation specular to the first zone 36 with respect to the third longitudinal axis Z of the third transmission shaft 30.

Preferably, the shape of each recess of the second zone 37 comprises a slide 71 adapted to assist the alternating insertion/extraction movement of the meshing element 44a from/into the recess 70, and a step 72 adapted to act as an end-stroke during the insertion movement of the meshing element 44a.

Even more preferably, the slide 71 and the step 72 are arranged consecutively along the reverse rotation direction.

In other words, the transmission shaft 30 has a first zone 36 adapted to accommodate each third transmission member 31, when configured by the activation device 40 in the selected condition, a second zone 37 adapted to accommodate the third transmission member used for gear reversal 32, when configured in the selected condition, and a third zone 38 splined to accommodate the cogged crown 34.

As can be seen in FIG. 10, the first zone 36 and the second zone 37 are advantageously modelled in the opposite manner since, as explained above, the third transmission members 31 and the third transmission member used for gear reversal 32 become integral with the third transmission shaft 30 when the latter rotates about the third longitudinal axis Z thereof according to two different and opposite rotation directions.

Figure 8:
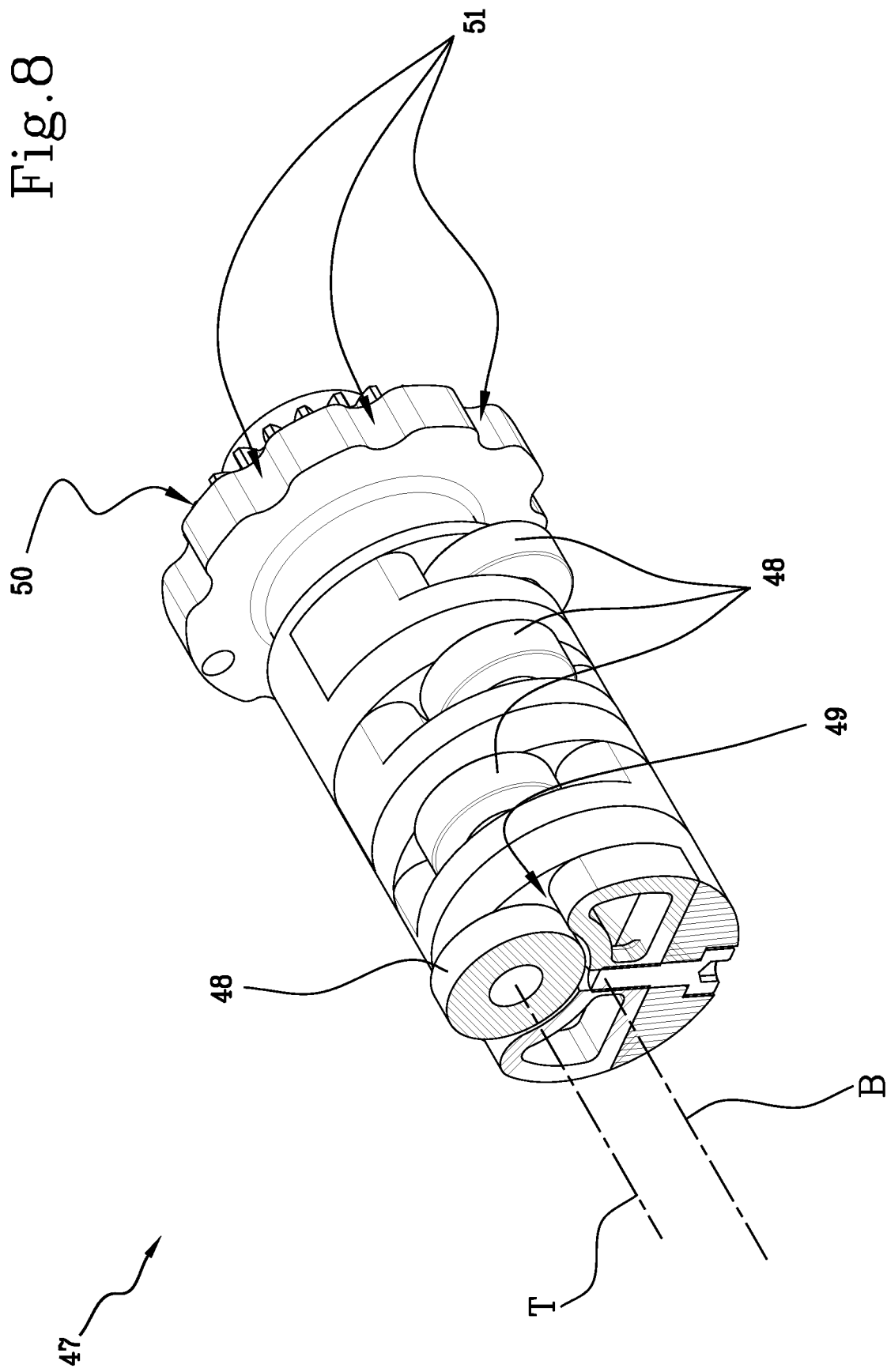
FIG. 8 illustrates, in perspective view, an embodiment example of a drum of the activation device.

According to another aspect of the invention illustrated in FIG. 1 and in more detail in FIG. 8, the activation device 40 comprises a drum 47 rotating about an extension axis B thereof. The drum 47 comprises on the external surface thereof a plurality of the rotating elements 48 each in a position such as to interact with a respective activation disc 42 to generate the deformation of the portion of deformable material 42b.

Preferably, the drum 47 is cylindrical in shape and extends along the rotation axis B thereof for at least a length equal to the length of the series of gear wheels 33 arranged on the third transmission shaft 30.

According to a further aspect of the invention, the rotating elements 48 are angularly divided preferably symmetrically around the extension axis B and spaced apart along the same extension axis B according to a distance equal to the mutual distance of the activation discs 42.

According to an aspect of the invention, each rotating element 48 is structurally distinct from the drum 47, which has slots in which the rotating elements distributed along the external surface are housed.

Preferably, the rotating members 48 consist of sensors (also numbered 48) housed in slots 49 distributed along the external surface of the drum 47 according to a predetermined order.

Preferably, the slots 49 are obtained by mechanical machining from a full piece of material and subsequently constrained on the drum 47 by threaded fastening systems.

Alternatively, the slots 49 may be made by a printing process, for example three-dimensional additive printing.

According to one aspect of the invention, the rotating elements 48 are cylindrical and rotatable about the respective rotation axis T, each of which is parallel to the extension axis B of the drum 47. Each rotating element 48 is also arranged at a radial distance from the extension axis B such that it is protruding with respect to the external surface of the drum.

In other words, the sensors 48 are cylindrical and the rotation axis T thereof is parallel to the rotation axis Z of the third transmission shaft 30 and to the extension axis B of the drum 47.

Preferably, the rotation axes T of the sensors 48 are positioned at a radial distance with respect to the rotation axis B of the drum 47 so that the sensors 48 protrude from the external surface of the rotating drum 47 by a percentage with respect to the diameter thereof.

According to another aspect of the invention, the sensors 48 are arranged on the external surface of the drum 47 along a helical trajectory such as to wrap along the external surface of the same drum 47 in the direction of the extension axis B.

Preferably the sensors 48 are angularly symmetrically divided around the rotation axis B of the drum 47. Even more preferably, the sensors 48 are spaced apart along the rotation axis B according to a distance equal to the mutual distance of the gear wheels 33 present on the third transmission shaft 30.

In other words, the sensors 48 of the drum 47 are housed thereon so as to be positioned at the gear wheels 33, during an operating configuration of the apparatus 1. In particular, each sensor 48 of the drum 47 is positioned at a respective activation disc 42.

According to one aspect of the invention, the drum 47 comprises a movement element 50 configured to rotate the same drum 47 about the axis B thereof. In turn, the movement element 50 has along the perimeter edge a cylindrical portion provided with a plurality of depressions 51 numerically equal to the number of rotating elements 48 housed on the drum 47 and such as to allow the angular position assumed by the drum 47 itself to be identified.

Alternatively, the latter operation can be implemented using an optical sensor configured to detect specific reference points and the movement thereof, such as notches arranged in place of the aforementioned depressions.

Preferably, the movement element 50 comprises a gear wheel configured to be engaged with another gear wheel, for example, connected to the shaft of an electric movement motor arranged to correctly move and position the drum 47. Such an electric motor can be of the brushless or DC or stepper type.

Figure 9:
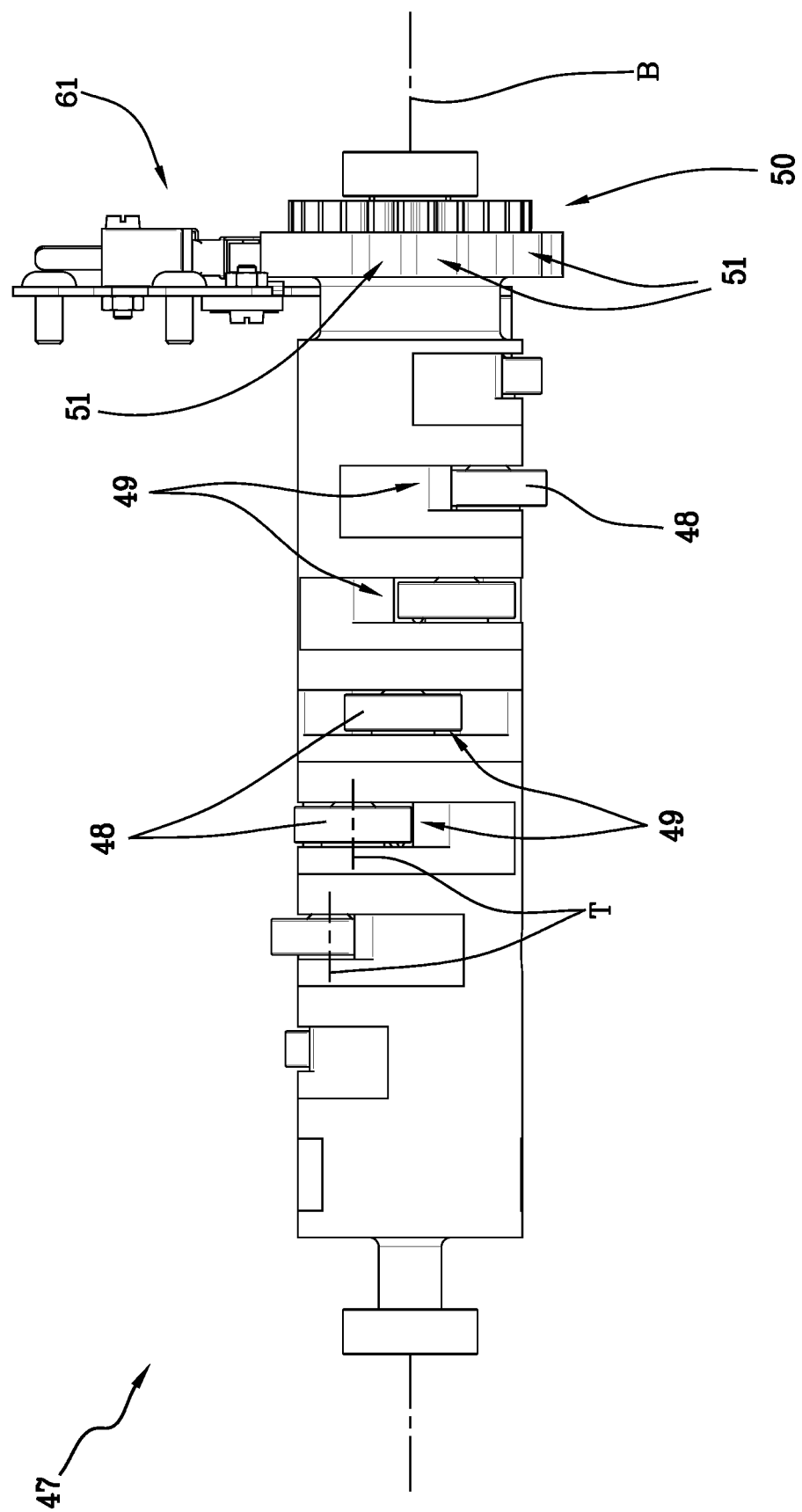
FIG. 9 illustrates, in side view, the drum illustrated in FIG. 8.

According to one aspect of the invention (visible in FIG. 9), the apparatus 1 comprises a micro-switch 61 (or a similar component in operation) such as to perceive information on the angular position of the drum 47, for example following the selection of a particular transmission ratio, by the interaction of a portion of the micro-switch 61 in a depression 51 of the movement element 50 of the drum 47.

Preferably the micro-switch 61 is connected and interacting with an electric motor and/or with the electric movement motor of the drum 47.

Even more preferably, the depressions 51 of the movement element 50 are adapted to interact with a position sensor, for example, made with a lever having an end provided with a roller and an arm connected to an electronic micro-switch 61, or other types of optical positioning sensors, so as to switch it based on a certain operating condition.

Preferably, the micro-switch 61 is connected by electrical wiring to a small electronic display, positioned in view of a bicycle user, to provide the information related to the transmission ratio inserted in that moment.

According to an aspect of the invention, the apparatus 1 comprises a torque sensor 62 interposed between the shaft of the pedal cranks 10 and the second transmission shaft 20 and is configured to detect the pedal torque applied by the cyclist while pedalling.

Advantageously, the torque sensor 62 is connected to the electric assist motor 60, for example by a control unit (not shown), so as to activate the same electric assist motor 60 as a function of the detected pedal torque value applied by the cyclist.

In other words, according to a possible aspect of the invention, the activation and adjustment of the assist motor torque value provided occurs when the torque sensor 62 detects that the pedal torque of the cyclist exceeds a predetermined value. Therefore, beyond such a predetermined value, the electric assist motor 60 is activated to assist the rider, while below such a value it is deactivated.

According to an aspect of the invention, the torque sensor 62 comprises a rigid portion connected to the cover casing of the device for changing the transmission ratio and a deformable portion connected to the second transmission shaft 20. Both portions comprise sensors, for example strain gauges, associated with each other and configured to constantly detect the mutual distance thereof. The pedalling of the cyclist is such as to induce a distancing movement between the main gear wheel 14 and the inlet pinion 24. Such a distancing causes a geometric deformation of the deformable portion of the torque sensor 62 such that the distance between the sensors changes. Thus, the torque sensor 62 is configured to detect such deformation and, by the control unit, convert it to a torque value applied by the cyclist on the pedals. Such a value is subsequently used to determine the activation and adjustment of the operation of the electric assist motor 60.

According to a preferred aspect of the invention, the control unit is configured to allow the activation of the reverse gear only if the vehicle is detected as stationary.

According to another aspect of the invention, the control unit is connected to a control panel (not shown) configured to allow the cyclist to select the preferred transmission ratio, including the reverse gear ratio. The control unit is therefore connected to the micro-switch 61 to activate it and determine, by the movement element 50, the correct positioning of the drum 47 in order to select the correct transmission ratio.

Advantageously, the control panel comprises a selector element, for example a button, configured to activate the electric assist motor 60 so as to move the transmission shafts 30, 20 of the apparatus 1 and, therefore, impose the movement of the pedal vehicle 100, subsequent to the configuration in the selected condition of one of the third transmission members 31, 32, i.e., both the transmission ratios for the forward movement of the vehicle and the reverse transmission ratio.

According to an aspect of the invention, the apparatus 1 is connectable to a control panel (not shown) configured to allow an operator to select the preferred transmission ratio to be used, whether to activate or deactivate the electric assist motor 60. Such a control panel can comprise a lever useful for selecting the gear ratio or a simple electrical connection connected to the activation device 40. Furthermore, the control panel can comprise an on or off button of the electric assist motor 60 and a display for displaying the selected transmission ratio.

According to a preferred aspect of the invention, the third and the second transmission members 31, 32, 21, 22 comprise gear wheels engaged with each other to define the transmission ratios.

Even more preferably, the third and the second transmission member used for gear reversal 32, 22, between which the gear reversal member 2 is interposed, are arranged along the respective transmission shaft 30, 20 and to the side with respect to the other transmission members 31, 21.

According to one aspect of the invention, each third and second transmission member 31, 32, 21, 22 has a different radial dimension from the others. In particular, each pair formed by a third transmission member 31, 32 engaged with a corresponding second transmission member 21, 22 defines a different transmission ratio from the others so as to define different possible vehicle advancement speeds.

Preferably, each transmission shaft 30, 20 comprises a plurality of respective transmission members 31, 21, in particular a series of gear wheels 33, 23 arranged according to an ordered sequence along the respective longitudinal axis Z, Y.

According to a possible illustrated embodiment, the sequence of the gear wheels 33, 23 can be ordered in ascending or descending order in terms of radial dimensions and/or number of teeth of each gear wheel.

Alternatively, the sequence of the gear wheels 33, 23 can be ordered along the respective longitudinal axis Z, Y so as to define a double cone or similar geometric figures or other figures still not expressly identified herein.

According to a preferred aspect of the invention, the plurality of third transmission members 31 and second transmission members 21 comprise the same number of transmission members so as to determine an equal number of transmission ratios.

In other words, the number of gear wheels 33 of the series of the third transmission shaft 30 is equal to the number of gear wheels 23 of the series of the second transmission shaft 20.

Preferably, the number of gear wheels 33, 23 of each series is between a minimum of two wheels and a maximum of twenty wheels, even more preferably, the number of gear wheels 33, 23 of each series is equal to ten gear wheels.

Thus, the number of achievable transmission ratios is equal to the number of gear wheels 33, 23 of the respective series.

Preferably, the ordered sequence of gear wheels 33 of the third transmission shaft 30 is subordinate to the ordered sequence of gear wheels 23 of the second transmission shaft 20, or vice versa. In particular, the ordered sequence of gear wheels 33 is achieved in a decreasing or increasing manner in terms of the size and/or number of teeth of each gear wheel 23, or vice versa.

In other words, with reference to respective ends of the same side of the third transmission shaft 30 and of the second transmission shaft 20, if the series of gear wheels 33 of the third is of increasing type, the series of gear wheels 23 of the second associated therewith is of decreasing type.

Alternatively, the sequence of gear wheels 33 may not be counter-shaped to the sequence of gear wheels 23 and have its own shape, but at least part of the gear wheels 33 are engaged with the gear wheels 23.

According to a preferred aspect of the invention, the shaft of the pedal cranks 10 and the third transmission shaft 30 are coaxial with each other and, consequently, the shaft of the pedal cranks X and the third longitudinal axis Z coincide with each other.

Preferably, the shaft of the pedal cranks 10 is inserted within the third transmission shaft 30 as the latter has a greater cross-section than that of the shaft of the pedal cranks 10. Thus, at least the third transmission shaft 30 is made hollow. Thereby, the third transmission members 31, 32 are arranged along the side surface of the third transmission shaft 30, while the main gear wheel 14 and the pedal cranks 4 are connected to the side ends 11 of the shaft of the pedal cranks 10, which are protruding with respect to the third transmission shaft 30. Accordingly, the main gear wheel 14 and the inlet pinion 24 are arranged to the side of the first and the second transmission members 31, 32, 21, 22, respectively.

According to one aspect of the invention, the third transmission shaft 30 comprises a cogged crown 34 splined to rotate integrally with the same third transmission shaft 30. In particular, the cogged crown 34 is arranged to the side of the first transmission members, preferably opposite the main gear wheel 14 of the shaft of the pedal cranks 10.

Figure 11:
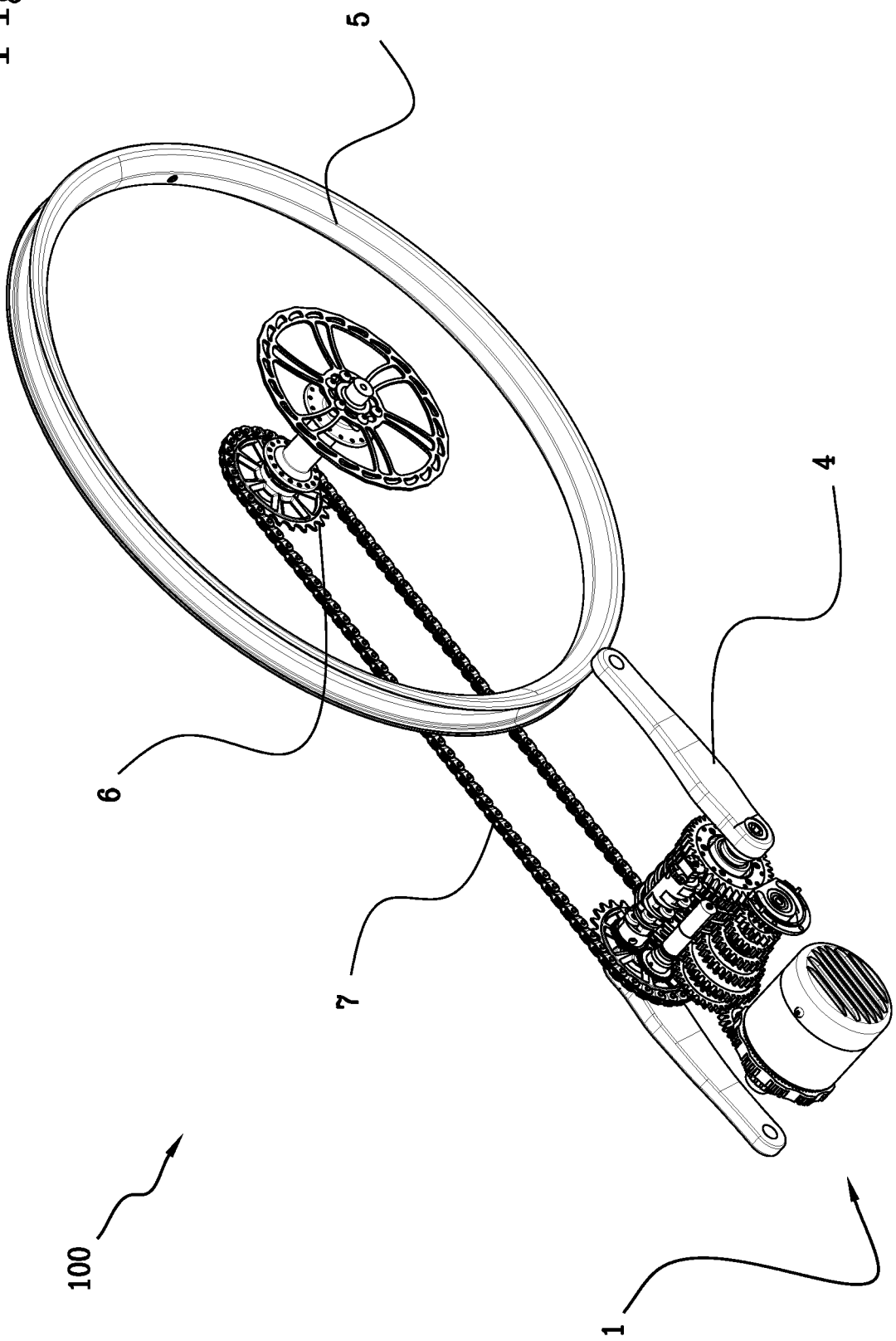
FIG. 11 illustrates, in perspective view, an apparatus for gear reversal applied to a rear drive wheel of a bicycle.

Preferably, the cogged crown 34 can be a gear wheel adapted to engage with a toothed belt or a transmission chain 7, in particular a bicycle transmission chain 7, as seen in FIG. 11, directed to the drive wheel 5 of the bicycle.

According to an aspect of the invention, the tertiary gear wheel 25 coincides with one of the second transmission members 21, 22 of the second transmission shaft 20.

Advantageously, each second transmission member 21, 22 is integral with the second transmission shaft 20 and, therefore, the action of the electric assist motor 60 on any of such second transmission members 21, 22 is such as to rotate the entire second transmission shaft 20 and the third transmission members 31, 32, but not the third transmission shaft 30 and the shaft of the pedal cranks 10, unless one of the third transmission members is configured in the selected condition. When one of the third transmission members 31, 32 is in the selected condition, only the third transmission shaft 30 is integral therewith and, consequently rotating, while the shaft of the pedal cranks 10, given the presence of a free wheel at the main gear wheel 14, is independent in movement with respect to the action induced by the electric assist motor 60.

As illustrated in FIG. 11, the invention also relates to a pedal vehicle 100 comprising the apparatus 1 for gear reversal described above.

According to an aspect of the invention, the pedal vehicle 100 may be a bicycle or a cargo-bike comprising a pair of pedal cranks 4 each of which is connected to a respective end of the shaft of the pedal cranks 10 and a drive wheel 5 having an outlet pinion 6 splined and associated by a fixed snap connection with the third transmission shaft 30 so as to rotate integrally with the same third transmission shaft 30 both according to a main travel direction and according to an inverted travel direction.

In other words, there is no free wheel on the drive wheel 5 of the pedal vehicle 100, since one or more free wheels are arranged inside the apparatus 1 to allow a free counter-pedalling movement by the cyclist without this generating a blocking of the transmission and, therefore, of the rotation of the drive wheel 5.

In FIG. 11, the outlet pinion 6 is directly connected to the cogged crown 34 of the third transmission shaft 30 by a transmission chain 7.

If the pedal vehicle 100 is a cargo-bike, it has a pair of rear drive wheels 5 and also a loading area, front or rear, in which the objects to be transported are housable.

Therefore, the cargo-bike is a bulky vehicle with more difficult maneuverability than a normal bicycle.

Therefore, the arrangement of an apparatus 1 for gear reversal is advantageously able to allow the cyclist to move the cargo-bike with considerably less effort if, for example, it has a heavy load, it is on a sloping road or it is blocked in a narrow road in which it is impossible to use steering to reverse directions.

The invention claimed is:

1. A transmission apparatus, comprising:
a shaft of a pedal crank configured to rotate about an axis of the pedal crank and comprising a main gear wheel configured to transfer the rotary motion of said shaft of the pedal crank to a second transmission shaft by an inlet pinion engaged with said main gear wheel when the shaft of the pedal crank rotates in a main rotation direction of the pedal crank, the main rotation direction corresponding to a main travel direction of a device housing the transmission apparatus, wherein the rotary motion of said shaft of the pedal crank is not transferred to said second transmission shaft when the shaft of the pedal crank rotates in a reverse rotation direction with respect to the main travel direction of the device housing the transmission apparatus;
said second transmission shaft configured to rotate about a second longitudinal axis parallel to and spaced apart from the shaft of the pedal crank, said second transmission shaft comprising a plurality of integral second transmission members and arranged in sequence along said second longitudinal axis;
a third transmission shaft configured to rotate about a third longitudinal axis parallel and spaced apart from said second longitudinal axis, said third transmission shaft comprising a plurality of third transmission members arranged in sequence along said third longitudinal axis, wherein said shaft of the pedal crank is located within said third transmission shaft and said axis of the pedal crank and said third longitudinal axis coincide;
each third transmission member being configurable between a non-selected condition and a selected condition, wherein, in the non-selected condition, the third transmission member freely rotates about the third longitudinal axis and wherein, in the selected condition, the third transmission member rotates about the third longitudinal axis solidly constrained to the third transmission shaft, wherein at least one of said third transmission members and at least one of said second transmission members are engaged with each other to establish a predetermined transmission ratio between said third transmission shaft and said second transmission shaft;
an activation device adapted to configure in the selected condition at most only one of said third transmission members to select the relative transmission ratio, wherein the relative transmission ratio defines a travel direction of the device housing the transmission apparatus by the activation device selecting one of the plurality of integral second transmission members that is used for gear reversal to be engaged with one of the plurality of third transmission member that is used for gear reversal to rotate the third transmission shaft in the reverse rotation direction; and a mechanism which motorizes at least one of the second transmission members or a tertiary gear wheel integral with said second transmission shaft;

said mechanism being configured to induce a movement of said second transmission shaft in the main travel direction and with the reverse travel direction of the device housing the transmission apparatus, said reverse travel direction being based upon when said activation device has selected one of said second transmission members to be engaged with a corresponding third transmission member and used for gear reversal, wherein said engagement rotates said third transmission shaft in the opposite direction of the main travel direction and wherein said shaft of the pedal crank does not rotate in the opposite direction.

2. The apparatus according to claim 1, wherein said mechanism which motorizes comprises a gear reversal member, an idler wheel, interposed and engaged between one of said second transmission members used for gear reversal and a third transmission member also used for gear reversal so that said third and said second transmission shaft have the same rotation direction when the third transmission member used for gear reversal is configured in the selected condition.

3. The apparatus according to claim 2, comprising an electric assist motor engaged with a tertiary gear wheel mounted on said second transmission shaft;

said electric assist motor or at least one of the second transmission members comprising a free wheel of the motor configured to transmit a rotational motion from the electric assist motor to said second transmission shaft in a single rotation direction of the electric assist motor.

4. The apparatus according to claim 1, wherein said mechanism which motorizes comprises:

an electric assist motor engaged with a tertiary gear wheel mounted on said second transmission shaft;

a control unit connected to said electric assist motor and programmed to configure said electric assist motor between a forward condition, in which it transmits to the shaft of the pedal crank and the third transmission shaft a rotation in the main rotation direction, and a reverse condition, in which it transmits to the third transmission shaft a rotation opposite the main rotation direction and, at the same time, does not transmit any rotation to the shaft of the pedal crank.

5. The apparatus according to claim 1, wherein said activation device comprises a plurality of activation discs each operationally connected to a respective third transmission member;

each activation disc being rotatably movable with respect to the respective third transmission member about said third transmission shaft between a first operating position and a second operating position;

each activation disc being configured to rotate selectively in a solidly constrained manner the respective third transmission member with said third transmission shaft from the non-selected condition to the selected condition by the generation of a transitory rotation speed difference between the third transmission member selected and the relative activation disc so as to bring the latter from the first operating position to the second operating position.

6. The apparatus according to claim 5, comprising a meshing system operatively interposed between each activation disc and the third transmission shaft;

said meshing system comprising at least one meshing element integral with a respective gear wheel and a lever integral with a respective activation disc;

said activation disc and said lever being movable alternately to define the first non-operating position and the second operating position of the activation disc in which, respectively, it releases and connects in a solidly constrained manner the respective gear wheel to the third transmission shaft through the consequent alternating movement of the meshing element with respect to the third transmission shaft to rigidly connect the gear wheel with the third transmission shaft.

7. The apparatus according to claim 6, wherein said third transmission shaft comprises at least a first zone shaped to accommodate each meshing when the respective activation disc is configured in the second operating position;

said first zone comprising a plurality of recesses obtained radially around said third transmission shaft, each recess having an asymmetrical shape with respect to a radial axis to said third transmission shaft passing through the same recess to assist said alternating insertion and extraction movement of the meshing element therein.

8. The apparatus according to claim 7, wherein the shape of each recess of the first zone comprises:

a slide adapted to assist the alternating insertion/extraction movement of the meshing element from/into the recess;

a step adapted to act as an end-stroke during the insertion movement of said meshing element, arranged consecutively along the main rotation direction.

9. The apparatus according to claim 8, wherein said third transmission shaft comprises a second zone also shaped to accommodate the meshing element of the third transmission member used for gear reversal when the respective activation disc is configured in the second operating position;

said second zone having a specular conformation to said first zone with respect to said third longitudinal axis of the third transmission shaft.

10. The apparatus according to claim 7, wherein the shape of each recess of the second zone comprises:

a slide adapted to assist the alternating insertion/extraction movement of the meshing element from/into the recess;

a step adapted to act as an end-stroke during the insertion movement of said meshing element, arranged consecutively along the reverse rotation direction.

11. The apparatus according to claim 1, wherein said activation device comprises at least one rotating element moving operationally towards or away from an activation disc;

each activation disc having along the perimeter edge thereof a portion made of at least one deformable material;

said at least one rotating element of said activation device being configured to deform the portion of deformable material so as to generate said transitory speed difference.

12. The apparatus according to 1, wherein said activation device comprises a drum rotating about an extension axis thereof;

said drum comprising on the external surface thereof a plurality of said rotating elements each in a position such as to interact with a respective activation disc to generate said deformation of the portion of deformable material.

13. The apparatus according to claim 1, wherein said third transmission shaft comprises a cogged crown splined to rotate in a manner solidly constrained with the third transmission shaft;
   said cogged crown being arranged to the side of said third transmission members.

14. A pedal vehicle, comprising:
   a transmission apparatus for gear reversal according to claim 1;
   a pair of pedal cranks each connected to a respective side end of said shaft of the pedal cranks;
   a drive wheel having an outlet pinion splined and connected by a fixed snap connection to said third transmission shaft so as to rotate in a manner solidly constrained with said third transmission shaft both in a main travel direction and in a reverse travel direction with respect to said main travel direction.

* * * * *